United States Patent [19]

Senia

[11] Patent Number: 5,184,524
[45] Date of Patent: Feb. 9, 1993

[54] AUTOMATIC TRANSMISSION FLEXPLATE SHIELD

[75] Inventor: Michael D. Senia, Debary, Fla.

[73] Assignee: Star Remanufacturing, Inc., Cocoa, Fla.

[21] Appl. No.: 849,498

[22] Filed: Mar. 11, 1992

[51] Int. Cl.⁵ .............................................. F16P 1/00
[52] U.S. Cl. ..................................................... 74/609
[58] Field of Search ................................. 74/608, 609

[56] References Cited

U.S. PATENT DOCUMENTS

| | | | |
|---|---|---|---|
| 1,824,440 | 9/1931 | Meyer | 74/606 |
| 1,931,151 | 10/1933 | Mueller | 74/609 X |
| 3,455,409 | 7/1969 | Clark | 74/608 X |
| 3,696,689 | 10/1972 | Senter et al. | 74/609 |
| 4,064,765 | 12/1977 | McBride | 74/612 |
| 4,077,460 | 3/1978 | Halatek | 74/609 X |
| 4,324,533 | 4/1982 | Schroeder et al. | 74/612 |
| 4,683,771 | 8/1987 | Sogo et al. | 74/608 |
| 4,779,484 | 10/1988 | Poe | 74/608 |

Primary Examiner—Dirk Wright
Attorney, Agent, or Firm—Dennison, Meserole, Pollack & Scheiner

[57] ABSTRACT

A safety shield for insertion between the engine and transmission of a racing car or vehicle adapted for racing to protect the occupants, engine and transmission by interrupting or deflecting flexplate wheel fragments or debris in case of failure due to high engine speed. The safety shield is formed from a metal plate which has a centrally located, cup-shaped depression and a circular opening for the engine shaft. The depression includes a cylindrical wall portion and terminates in an inwardly directed flange portion. The depth of the depression is configured to encircle the flexplate wheel and its associated ring gear, so that in case of fragmentation, all wheel or gear fragments will be contained within the shield.

6 Claims, 2 Drawing Sheets

AUTOMATIC TRANSMISSION FLEXPLATE SHIELD

FIELD OF THE INVENTION

This invention relates to automotive engine components and more specifically, to a safety shield for enclosing the flexplate wheel which supports the starter ring gear.

In high performance automobiles, when used as racing cars or cars built for racing, engine speeds can reach and exceed 8,000 rpm. At these speeds, the wheel and starter ring can disintegrate under centrifugal force into a plurality of high-velocity fragments which can damage the transmission, the engine block, and other components. More importantly, the car's occupants can be injured if broken components can escape from the transmission bell housing.

Presently employed bell housings are not capable of containing such fragments or components with the result that vehicle damage and occupant injury has occurred when the wheels have exploded within conventional housings.

DESCRIPTION OF THE PRIOR ART

To protect the engine, U.S. Pat. No. 3,696,689 to Senter et al employs a flat plate mounted between a standard bell housing and the engine block. This assembly constitutes only partial solution to the problem since it does not contain flying parts, but only deflects them away from the engine. To contain the broken parts, it has been proposed to thicken the walls of the bell housing.

U.S. Pat. No. 3,455,409 to Clark proposes to use a soft, flexible rubber shield comprising two sections. While these patents describe techniques which provide some degree of satisfactory parts containment, their use is expensive and requires additional weight which is undesirable, particularly in race cars where every attempt is made to reduce weight without sacrificing safety and performance.

While the above noted prior art is directed to the problem of fragmentation of the drive components in racing vehicles and provides partial protection of the driver or occupants from injury, a device which is capable of fully absorbing the energy of fragments of high-speed parts or debris resulting from an explosion, and containing said fragments to completely protect the occupants, does not exist.

It is therefore an object of this invention to protect the occupants of a vehicle, such as a racing car, from fragments resulting from the disintegration of the flexwheel and starter ring. To accomplish this object, a shield is formed from material which is capable of absorbing the energy from high speed fragments or debris, and to fully contain such fragments.

It is a further object of the invention that a shield should be of lightweight design, and it should be easy to install or to remove without undue effort and special skill.

SUMMARY OF THE INVENTION

The safety shield of this invention comprises a formed metal plate of dimensions which are sufficient to encircle the flexplate and starter ring gear of an engine, to provide occupant protection by interrupting or deflecting all flexplate wheel fragments or debris in case of failure due to high engine speed. The essential feature of the shield is a centrally located, cup-shaped depression which has a circular opening for the engine shaft. The depression includes a substantially cylindrical wall portion and terminates in an inwardly directed flange portion. The depth of the depression is configured to encircle the flexplate wheel and its associated ring gear, so that in case of fragmentation, all wheel or gear fragments will be contained within the shield.

DESCRIPTION OF PREFERRED EMBODIMENTS

Figure 1:
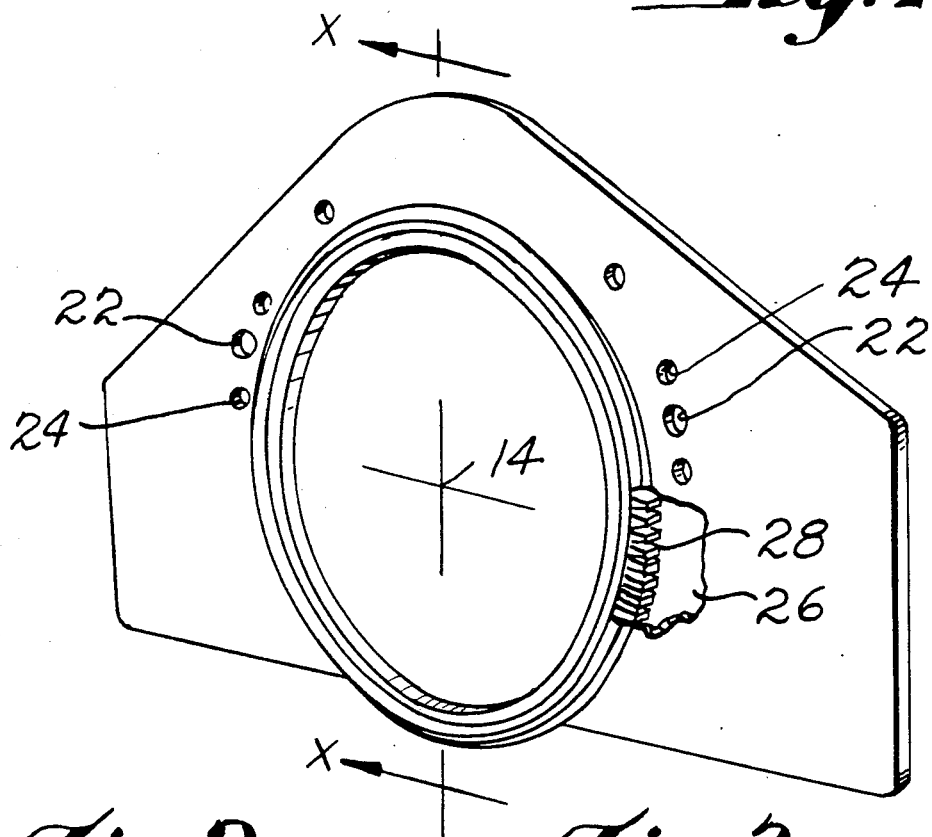
FIG. 1 is a perspective view of the invention.
Figures 2, 3:
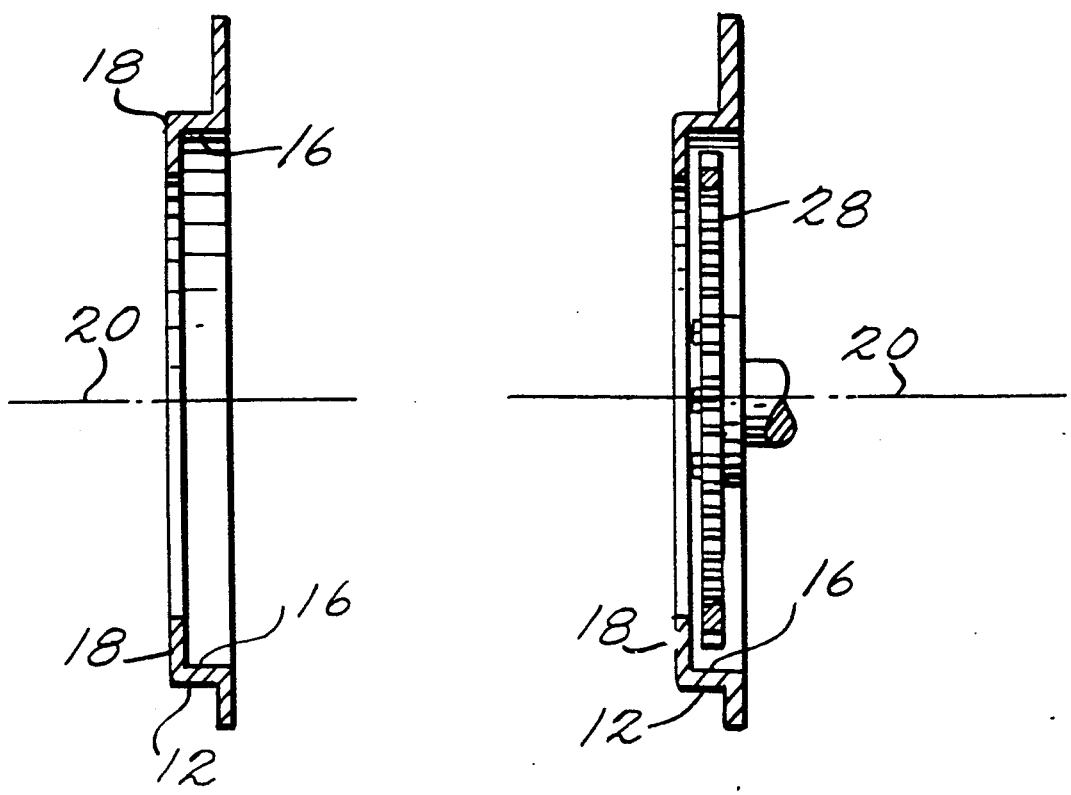
FIG. 2 is a sectional, side elevational view of the invention taken along a line X—X of FIG. 1.
FIG. 3 is a sectional view similar to FIG. 2, but on an enlarged scale and illustrating the relative position of the flexwheel and ring gear.

Turning now to the FIGS. 1-4, the preferred embodiment of the safety shield 10 is formed from a metal plate of substantially trapezoidal shape, although any shape configured to accommodate the particular engine transmission may be employed. A cup shaped depression 12 is formed at a generally central location 14, by any suitable means to generate a wall 16 of substantially cylindrical form terminating in an internally directed encircling flange 18 which is generally perpendicular to the axis of engine drive shaft 20.

The wall 16 is of a cylindrical shape and is dimensioned generally parallel to the drive shaft axis 20 and of a sufficient depth to encircle the entire width of the flexwheel and starter ring. The flange 18 is thus formed around a centrally located circular opening through which the engine drive shaft passes. When installed, the depression and flange abuts the transmission housing. Aligning openings 22 are provided in the shield to receive complementary dowel pins for aligning the shield to the transmission bell housing. A plurality of bolt holes 24 are provided at predetermined locations corresponding to the holes in the bell housing for completing the assembly. A peripheral opening 26 accommodates the starter motor pinion. A partial view of the starter ring teeth 28 is shown in FIG. 1. The trapezoidal form of the safety shield and particularly the side extensions 30, 32 have the secondary purpose of giving additional protection to the drive or other occupants of the car against flying debris and facilitate accommodation of the shield to a variety of engine-transmission and vehicle assemblies.

The safety shield 10 is preferably formed from a metal having sufficient ductility to absorb the energy of broken flexwheel or ring gear fragments without breaking or tearing and yet to have sufficient hardness to prevent any bolts used for attaching to the bell housing from being pulled through. Such metal is herein described as a "medium ductile" metal having an elongation between 28 percent and about 25 percent. Suitable metals include 1015, 1020 and 1025 hot rolled steels (AISI designation). Above 28 percent elongation (1015 standard steel), the metal is too soft and the assembly bolts distort the plte 10 and/or cause edge pieces of the plate to fail or break off. Below 25 percent (1025 standard steel), the material for the safety shield is too hard to form the central depression with the result that failure of the safety shield wall 16 or flange 18 can occur, permitting fragmented parts to escape.

Use of the aforementioned high ductile metal for the safety shield 10 provides the requisite elasticity and strength to allow the metal to yield when impacted by fragments of an exploding component without substantial failure so that the fragments are contained within the safety shield.

Figure 4:
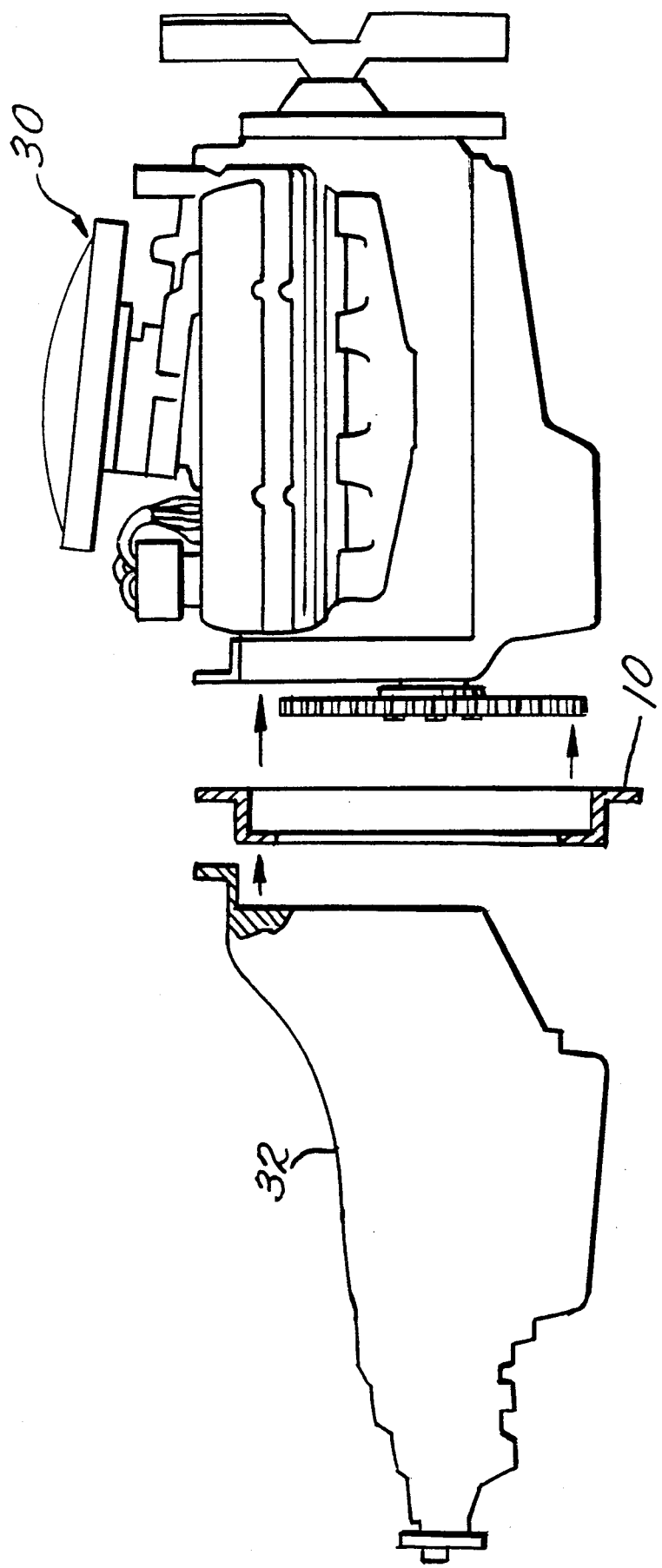
FIG. 4 is an exploded view of the relative position of the engine-shield-transmission assembly.

FIG. 4 illustrates the method of application of the safety shield to an engine-transmission assembly. In the figure, an engine 34 is separated from the transmission 36 for the purpose of installing the safety shield. As illustrated, upon separation, the flexplate wheel and ring gear 28 are exposed. The safety shield 10 is aligned in registry with the bell housing using alignment dowels (not shown) and complementary holes 22 and the shield is bolted between the engine and bell housing with the projecting cylindrical depression 12 and flange extending thereinto. Thus, upon reassembly of engine and transmission, the flexplate wheel and starter gear ring assembly are completely contained within the cup shaped depression 12 of the safety shield 10.

Operational Tests

A series of tests were performed in accordance with test methods for transmission protective devices. (SFI Foundation Inc. Performance Test Method 30.1 effective May 9, 1989). According to the test method, a flexplate was driven to a rotational speed between 9,500 and 10,500 rpm and maintained at that level until disintegration occurred. The invention described has successfully demonstrated its capability to contain all fragments and debris within the safety shield.

While the safety shield described in the preferred embodiment is fabricated from metal, it would be within the contemplation of the invention to use non-metallic shields which could be formed by any suitable method. Such changes and variations of the preferred embodiment of the invention may be made without departing from the inventive concept and it is not intended to limit the invention otherwise than as defined by the appended claims.

What is claimed is:

1. A safety shield for an engine-transmission assembly formed from material having sufficient ductility to absorb the energy of flexplate wheel and starter ring fragments without breaking, said safety shield comprising a base portion of substantially trapezoidal form, a circular cup-shaped depression in a generally central location on said base portion, said depression generating a generally cylindrical wall configured to overly said flexplate wheel and its components and terminating in a flange portion generally perpendicular to an engine shaft, and formed around an opening for passing an engine shaft and operating to absorb and disburse the energy of high-speed fragments.

2. The safety shield of claim 1, further including an opening located peripheral to the engine shaft opening and cup-shaped depression for receiving the shaft and the pinion of a starter motor.

3. The safety shield of claim 1, further including means defining alignment openings for securing the alignment of said safety shield to a transmission-engine combination in a predetermined position.

4. The safety shield of claim 1, wherein the material is hot rolled steel of approximately 0.21" thickness.

5. In combination with an automotive engine and transmission, where the engine can be driven to exceed speeds at which centrifugal disintegration of drive components may occur, a safety shield for installation between the engine and the transmission, configured to completely encircle the portion of the engine flexwheel and starter ring gear assembly subject to such centrifugal disintegration, to contain fragments in case of such disintegration, said safety shield comprising a flat base portion of substantially trapezoidal shape, a cup-shaped depression including a cylindrical containment portion, said containment portion including a flanged portion defining an opening to accommodate an engine crankshaft and an opening located peripheral to the engine shaft opening and cup shaped depression, for receiving the shaft and pinion of a starter motor.

6. For use in a vehicle, such as a racing car, said vehicle having an engine, flexplate wheel and starter ring gear, and a transmission, and including means to protect the vehicle occupants in case of centrifugal flexplate failure as a result of high engine speed, an improved safety shield installed between the engine and transmission, said safety shield comprising a flat portion of substantially trapezoidal form, a circular cup-shaped depression in a generally central location, said depression generating a cylindrical wall extending over the width of the flexwheel and associated components, and a flange portion generally perpendicular to an engine shaft and defining an opening for an engine shaft, said cylindrical wall and said flange portion operating to absorb and disburse the energy of high speed fragments while containing said fragments within said shield.

* * * * *